US011181982B2

(12) United States Patent
Bastide et al.

(10) Patent No.: US 11,181,982 B2
(45) Date of Patent: Nov. 23, 2021

(54) REPETITIVE STRESS AND COMPULSIVE ANXIETY PREVENTION SYSTEM

(71) Applicant: INTERNATIONAL BUSINESS MACHINES CORPORATION, Armonk, NY (US)

(72) Inventors: Paul R. Bastide, Boxford, MA (US); Mikaela C. Falk, New York, NY (US); Tushar Kumar Jayantilal, Coppell, TX (US); Fang Lu, Billerica, MA (US); Ishwarya Rajendrababu, Hoboken, NJ (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 16/051,552

(22) Filed: Aug. 1, 2018

(65) Prior Publication Data
US 2020/0042086 A1  Feb. 6, 2020

(51) Int. Cl.
*G06F 3/01* (2006.01)
*H04L 12/58* (2006.01)
*H04L 12/24* (2006.01)

(52) U.S. Cl.
CPC .............. *G06F 3/015* (2013.01); *G06F 3/016* (2013.01); *H04L 41/0618* (2013.01); *H04L 41/0686* (2013.01); *H04L 51/12* (2013.01); *H04L 51/24* (2013.01); *G06F 2221/032* (2013.01)

(58) Field of Classification Search
None
See application file for complete search history.

(56) References Cited

U.S. PATENT DOCUMENTS

| 6,466,232 | B1 | 10/2002 | Newell et al. |
| 7,145,550 | B2 | 12/2006 | Gehlot et al. |
| 7,602,427 | B2 | 10/2009 | Horvitz et al. |
| 7,603,427 | B1 | 10/2009 | Horvitz |

(Continued)

OTHER PUBLICATIONS

Haslam, "Beware iPhone RSI", http://www.macworld.co.uk/opinion/apple/beware-iphone-rsi-3486135/, Mar. 10, 2011, 1 page.

(Continued)

*Primary Examiner* — Christopher J Fibbi
(74) *Attorney, Agent, or Firm* — Dmitry Paskalov (57) ABSTRACT

Embodiments of the present invention disclose a method, computer program product, and system for reducing notifications on a user device to mitigate a user's injury associated with repetitive stress of using the user device. One or more notifications associated with the user device are received. A notification profile associated with the user is generated based on the received one or more notifications. In response to a query, position data and vital sign data associated with the user is received. The received position data and vital sign data associated with the user is analyzed and a health score associated with the user is calculated based on analyzed position data and vital sign data. In response to determining the health score deviates from a threshold range, the generated notification profile associated with the user is modified. One or more notifications alerts are communicated to the user based on the modified notification profile.

15 Claims, 4 Drawing Sheets

(56) References Cited

U.S. PATENT DOCUMENTS

| | | | |
|---|---|---|---|
| 8,941,500 B1* | 1/2015 | Faaborg | H04W 68/00 |
| | | | 340/573.1 |
| 9,560,629 B2 | 1/2017 | Migicovsky et al. | |
| 2007/0197195 A1 | 8/2007 | Sugiyama et al. | |
| 2010/0156783 A1 | 6/2010 | Bajramovic | |
| 2014/0007010 A1* | 1/2014 | Blom | G06F 3/0481 |
| | | | 715/825 |
| 2014/0107932 A1* | 4/2014 | Luna | G01D 21/00 |
| | | | 702/19 |
| 2014/0258270 A1* | 9/2014 | Reese | G06F 16/9535 |
| | | | 707/722 |
| 2015/0297140 A1* | 10/2015 | Hernandez | A61B 5/165 |
| | | | 600/547 |
| 2019/0045020 A1* | 2/2019 | Ein-Gil | G06F 16/9535 |
| 2019/0158448 A1* | 5/2019 | Anders | H04L 67/306 |
| 2019/0373114 A1* | 12/2019 | Gullander | H04M 1/0279 |

OTHER PUBLICATIONS

Horwitz, "Fifteen new user experience issues revealed in early Apple Watch reviews", Apr. 8, 2015, https://9to5mac.com/2015/04/08/fifteen-new-user-experience-details-revealed-in-early-apple-watch-reviews/, 16 pages.

Morrison et al., "The Effect of Timing and Frequency of Push Notifications on Usage of a Smartphone-Based Stress Management Intervention: An Exploratory Trial", Published: Jan. 3, 2017, Plos One, Tenth Anniversary, pp. 1-10.

Webmd, "Repetitive Strain Injury", Feb. 21, 2000, http://www.webmd.com/a-to-z-guides/features/repetitive-strain-injury, 2 pages.

\* cited by examiner

REPETITIVE STRESS AND COMPULSIVE ANXIETY PREVENTION SYSTEM

BACKGROUND

The present invention relates generally to the field of biometric data collection, and more particularly to reducing notifications on wearable devices via biometric data analysis.

As electronic devices become more integrated into various aspects and uses of daily life various applications have been developed that aid in the user's ability to keep track of emails, calendar events, workout schedule and work out progress, and even biometric vital signs to improve workout performance. As the number of applications on a device increase so do the notifications associated with every application. The number of notifications or reminders being presented to the user may become cumbersome, an annoyance for the user, or even stressful as the user must keep monitoring the notification messages or alerts pop ups from these devices. Some wearables, by design, generate notifications for display when the user is doing nothing, alerting the user, for example, to stand up and move around. The user's attention is constantly being drawn to a device, and in the case of some wearables repetitive strain from constant checking of notifications may have negative health effects on joints and muscles, as the user must continuously raise the wrist to read the notification message. It may be advantageous to mitigate the potential repetitive stress injury or compulsive anxiety associated with continuously checking an ever-increasing amount of notifications.

SUMMARY

Embodiments of the present invention disclose a method, computer program product, and system for reducing notifications on a user device in order to mitigate a user's injury associated with repetitive stress of using the user device. One or more notifications associated with the user device are received. A notification profile associated with the user is generated based on the received one or more notifications. In response to a query, position data and vital sign data associated with the user is received. The received position data and vital sign data associated with the user is analyzed and a health score associated with the user is calculated based on analyzed position data and vital sign data. In response to determining the health score deviates from a threshold range, the generated notification profile associated with the user is modified. One or more notifications alerts are communicated to the user based on the modified notification profile.

DETAILED DESCRIPTION

Embodiments of the present invention relate to the field of computing, and more particularly to biometric data collection via wearable devices. The following described exemplary embodiments provide a system, method, and program product to, among other things, reduce repetitive stress injuries, sudden stress injuries, or compulsive anxiety derived from the use of wearable device. Therefore, the present embodiment has the capacity to improve the technical field of biometric data collection by recording the movement of the wearable device, representing a user's movements, analyzing the movement of the user, comparing the movement pattern of the user with the existing credible health guidelines, and altering notifications or interaction with the wearable device based on repetitive stress indicators. By bundling or delaying notifications displayed to the user of the wearable device, the user improves the device by decreasing the stress and potential injury of the user.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Various devices are integrated into every aspect of daily life. With the increasing popularity of wearable devices, application notifications are harder to ignore. For example, a mobile device may be placed in a pocket or away from a busy user, diminishing the effect of an audible or vibration notification alert, however, wearable devices however are harder to ignore as they are in direct contact with the user. Additionally, the user has a stronger incentive to wear the wearable device consistently due to a desire to accurately track various data, for example, step count, heartrate, blood pressure, blood oxygenation levels, or sleep patterns. Some of the consequences of constantly checking notifications generated by the wearable device are that stress or injury from repetitive motion, for example, carpal tunnel syndrome, may result. It may be advantageous to alter the time, number, or type of notification delivered or displayed to the user, based on repetitive stress indicators, in order to mitigate repetitive stress and/or compulsive anxiety. Additionally, it may be also advantageous to mitigate any stress of a user cause by frustration or annoyance of a wearable device that results from notification in order to increase the user's use duration of the device, or lengthen a uses session in order to increase the overall use of the wearable device over the long term. Furthermore, it may be advantageous to bundle or delay notifications in order to increase the efficiency of the wearable device as well as aid the user in avoiding stress.

Figure 1:
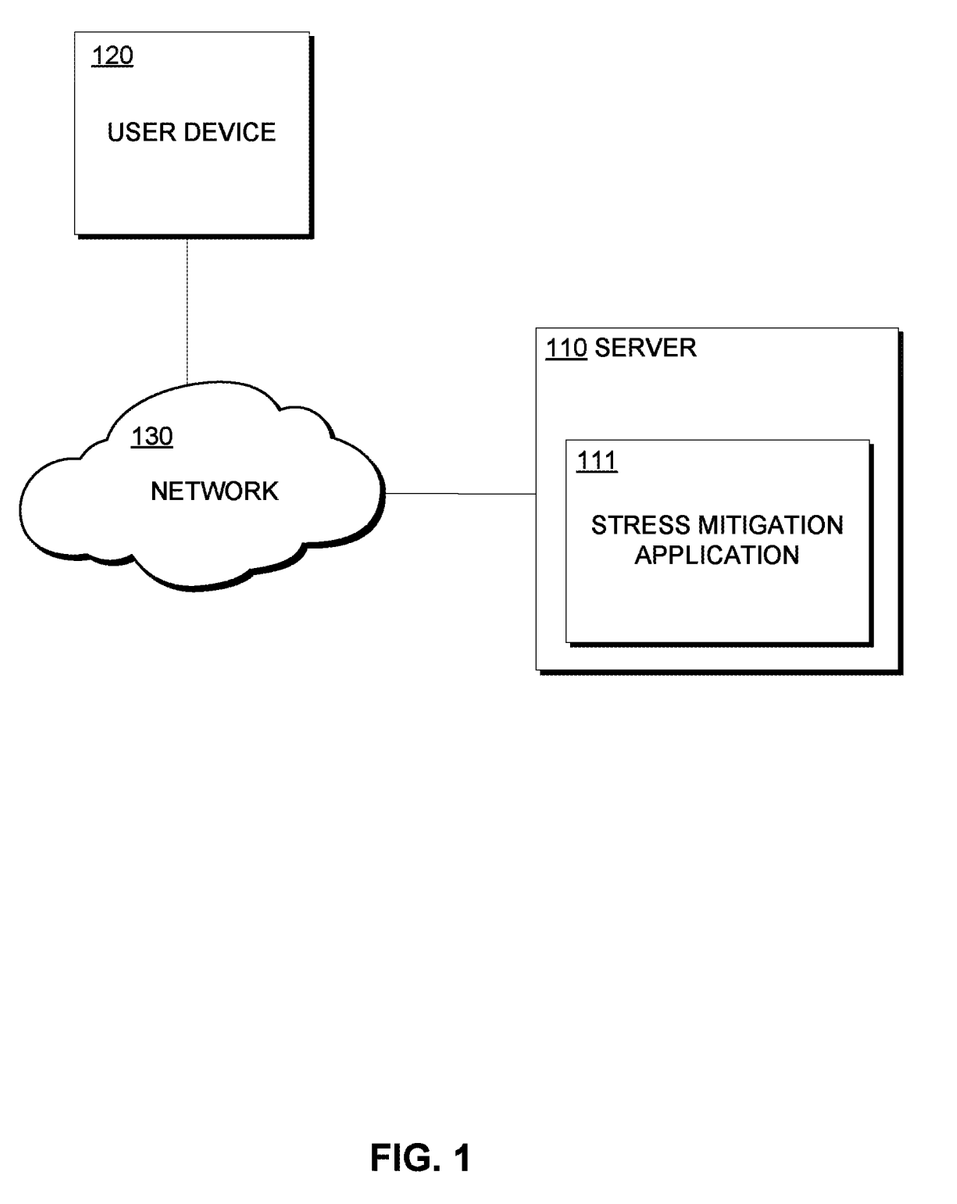
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. Distributed data processing environment 100 includes server 110 and user device 120, all interconnected via network 130.

Server 110 and user device 120 be a laptop computer, tablet computer, netbook computer, personal computer (PC), a desktop computer, a smart phone, or any programmable electronic device capable of communicating via network, for example, network 130 and with various components and devices within distributed data processing environment 100. Server 110 includes Stress mitigation application 111. Stress mitigation application 111 may communicate with user device 120 and manage notifications generated by user device 120. Server 110 and user device 120 may include internal and external hardware components, as depicted and described in further detail with respect to FIG. 4.

User device 120 may also be any programmable electronic device capable of the generation and display of notifications and the receiving of biometric data of a user. User device 120 may be, for example, a wristband, belt mount, head mount, integrated circuit contact lens, or other type of device capable of receiving biometric sensor data in order to may track the activity and/or physical data of a user. In various embodiments, user device 120 may be a wearable device, however, it should be appreciated that user device 120 may be a camera or a vibration sensor, for example, equipped in a treadmill or the floor of a room, for tracking the activity and/or physical data of a user.

In an embodiment, user device 120 may operate to receive biometric sensor data while stress mitigation application 111 may run primarily on server 110. In an alternative embodiment, stress mitigation application 111 may run primarily on user device 120 while server 110 may be used for processing and storage of data used by stress mitigation application 111. It should be noted that stress mitigation application 111 may be a standalone program or may be integrated into a larger application.

It should also be noted, that processing for stress mitigation application 111 may be shared amongst user device 120 and server 110 in any ratio. In another embodiment, stress mitigation application 111 may operate on more than one server, user device, or some combination of servers and user devices, for example, a plurality of user devices 120 communicating across network 130 with a single server 110. In another embodiment, for example, stress mitigation application 111 may operate on a plurality of servers 110 communicating across network 130 with a plurality of user devices 120. Alternatively, stress mitigation application 111 may operate on a network server communicating across network with server 110 and one or more user devices 120.

In various embodiments of the present invention, stress mitigation application 111 may act generally to reduces repetitive stress injuries, sudden stress injuries, or compulsive anxiety derived from wearable devices. For example, repetitive injury may occur from the twisting of the user's wrist in response to a notification alert and may manifest as carpal tunnel or lateral epicondylitis. Stress mitigation application 111 may recording the movement of the wearable device, for example user device 120, in response to movements of the user. Stress mitigation application 111 may analyze the movements of the user via the wearable device and compare the movement with movement patterns ingested from health guideline publications in order to generate repetitive stress indicators. Stress mitigation application 111 may alter the notification alerts or interaction queues generated by the wearable device based on the repetitive stress indicators in order to mitigate the user's potential injury associated with the repetitive stress of using the wearable device.

It should be appreciated that additional analysis of biometrics and vital signs received from the wearable device may be compared to additional publications ingested by server 110 or user device 120. For example, publications indicating heartrates over 90 beats per minute and/or blood oxygen levels below 90% as indicative of dangerous stress levels may be ingested by stress mitigation application 111, which stress mitigation application 111 would compare to received biometric data via user device 120.

Figure 2:
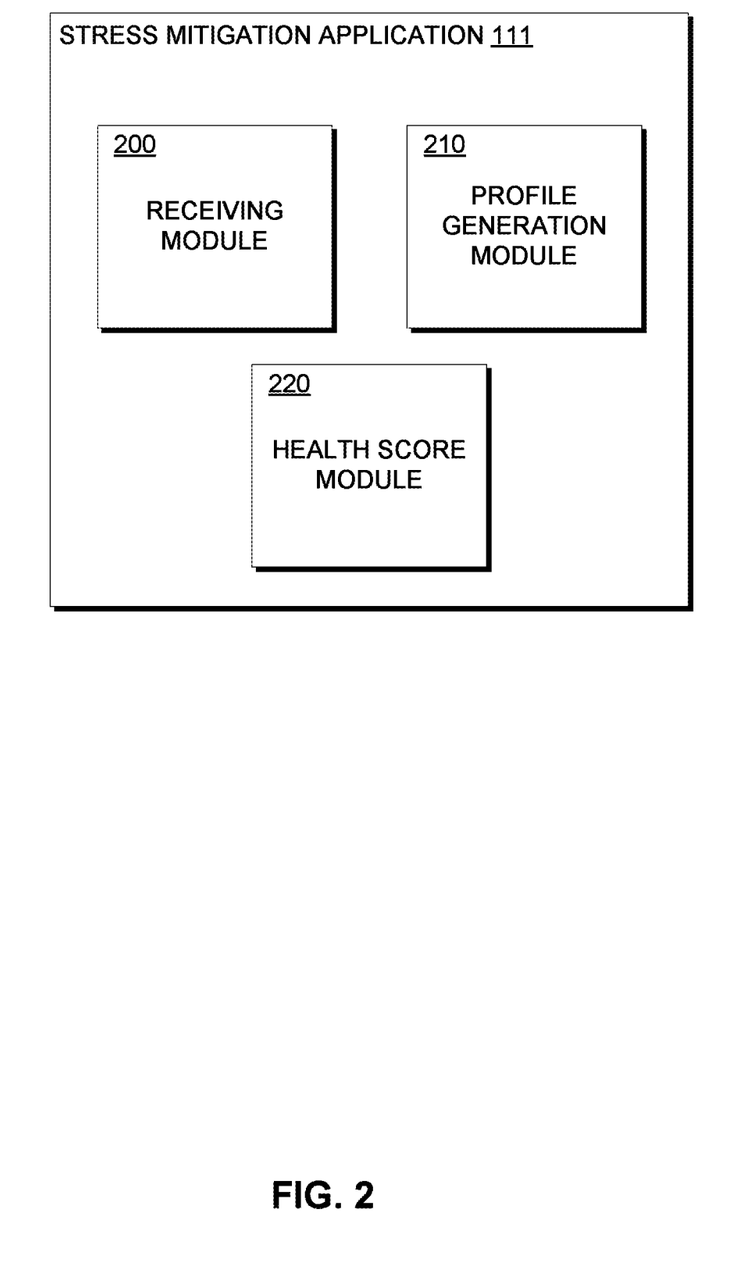
FIG. 2 is a functional block diagram illustrating the components of an application within the distributed data processing environment, in accordance with an embodiment of the present invention.

FIG. 2 is a functional block diagram illustrating the components of an application, for example, stress mitigation application 111, within server 110, within the distributed data processing environment 100, in accordance with an embodiment of the present invention, stress mitigation application 111 includes receiving module 200, profile generation module 210, and health score module 220.

In various embodiments, receiving module 200 may receive user login information associated with a user of a wearable device, for example, user device 120. Receiving module 200 may receive notification data from the wearable device, for example, the number of applications on user device 120 and the number of notifications generated by user device 120 within various time frames. Receiving module 200 may communicate the received user login information and notification data to profile generation module 210.

Profile generation module 210 may receive user login information notification data from receiving module 200. Profile generation module 210 generate a user profile associated with the received user login information. Profile generation module 210 may request additional information by generating a request and communicating the request to the user via a graphical user interface (GUI), for example, via a web browser on user device 120. In various embodiments, profile generation module 210 may analyze the received user login information and link with social media accounts associated with the received login information. Profile generation module 210 may utilize datamining of the linked social media accounts and analyze any extracted social media data or social media metadata using any tools know in the art, for example, Natural Language Processing. In various embodiments, profile generation module 210 may generate a baseline notification profile based on the received social media data and notification data. A baseline notification profile may include instructions to allow all notifications generated by the wearable device to be displayed and/or communicated to the user. Profile generation module 210 may communicate the received notification data to health score module 220.

In various embodiments, receiving module 200 receives ingested healthcare publications from via server 110. It should be appreciated that receiving module 200 may receive ingested documents from any source, for example, a remote or local data store, or receive raw textual data or documents and perform analysis in order to ingest the documents via, for example, semantic analysis or natural language analysis. Receiving module 200 may communicate ingested healthcare publications to health score module 220.

In various embodiments, receiving module 200 receives biometric data via sensors on a wearable device, for example, user device 120. Biometric data may include various clinical measurements, for example, pulse rate, temperature, respiration rate, and blood pressure, blood oxygen saturation level, blood glucose level, and the like. Other sensors on the wearable device being used by the user may detect gait speed, rotation angle, acceleration, location via a global positioning system, and the like. Receiving module 200 may communicate the received biometric data to health score module 220.

Health score module 220 may receive healthcare publication data and biometric data from receiving module 200. In various embodiments, health score module 220 receives biometric data including the angle and acceleration of the wearable device at various time intervals. Health score module 220 analyzes the motion of the wearable device and communicates with profile generation module 210 to determine whether the motion occurs concurrently with a generation of a notification. In various embodiments, health score module 220 may only analyze motion data if the angle is within an angle threshold representing an angle in which a notification displayed on the wearable device would be readable. For example, a user may be driving a car while wearing a user device, for example user device 120, on the wrist. Health score module 220 may receive an angle and acceleration change corresponding to a notification generation however health score module 220 may determine that although the angle change occurred in conjunction with the generation of a notification the angle would not be a viable viewing angle for the display of the wearable device. Therefore, health score module 220 would not count that event as corresponding to the user reading or viewing the notification.

Health score module 220 determines how many angle and acceleration changes, corresponding with the generation of notifications, correspond to read or viewed notifications and calculates a health score based on the number of read or viewed notifications and guidelines gleaned from the ingested healthcare publications. Health score module 220 may calculate the health score by comparing the change in motion and the frequency of the change in motion to the ingested publications. Health score module 220 may analyze other received biometric data to scale the calculated health score by, for example, adding a stress scalar value by which the health score is multiplied. Health score module 220 may compare various vital signs to norms established in healthcare publications and add a health score scaling value if the difference in the vital sign values are beyond a threshold when compared to the healthcare publication norms. Health score module 220 may communicate the calculated health score to profile generation module 210.

In various embodiments, profile generation module 210 receives the calculated health score from health score module 220. Profile generation module 210 may analyze the health score and determine a notification modification action to take based on the received health score and user profile. Profile generation module 210 may analyze the time interval that the wearable device is generating notifications and modify when the generated notifications are delivered or displayed to a user based on the user's motion state and the received health score. The user's motion state may be a combination of any biometric reading whether real time or historical that is associated with the user.

In an exemplary embodiment, profile generation module 210 determines the time interval to deliver or display notifications to the user via a wearable device, for example, profile generation module 210 may receive biometric data that conforms to a running motion and determines from the user profile history that the users running session will last 30 minutes with a confidence above a threshold. Profile generation module 210 then delays all notifications for that determined 30-minute time interval. If profile generation module 210 receives biometric data that the running session is completed but the user's heart rate or perspiration is determined to indicate a high stress level, as calculated in the health score, profile generation module 210 may continue to delay notifications beyond the 30 minute time interval.

It should be appreciated that in various embodiments, profile generation module 210 may generate a user selection for display on the wearable device that allows the user to directly modify the notification profile. For example, profile generation module 210 may generate a suggested time interval to delay notifications and query the user for a user selection input confirming or changing the suggested time interval. The user input selection may also indicate a desire to see all notifications and profile generation module 210 may deliver all generated notifications for a time interval that is predetermined or calculated based on the health score.

In various embodiments, profile generation module 210 may alter the delivery, communication, or display of generated notifications to the user via the wearable device by: bundling notifications; delaying notifications; checking the number of notifications against the threshold before notifying; blackout notifications for a time period that is scheduled for an alternate purpose, for example, a meeting on a calendar or scheduled social event; delay haptic feedback only but show notification visually; and/or check if the display of the wearable device is positioned towards the user, and only notify the user when that physical angle requirement is met.

It should be appreciated that specific movements, determined by analysis of received biometric data, or user input of option selections may scale the health score. For example, even if angle and rotation correlates to the user attempting to view notifications, however, if user is engaged in an activity where distraction would increase stress, for example, skiing or riding a bicycle, which may be determined based on the user profile, profile generation module 210 may continue to delay notifications to the user.

In various embodiments, profile generation module 210 may receive location data via global positioning system via server 110 or user device 120 and modify the notification delivery based on the user's location. For example, if user enters a location not associated with a previously visited locations, or unique location position, profile generation module 210 may deliver navigation related or map related notification but suppress all other notifications in order to allow the user to focus on the navigation. In various embodiments, depending on the user profile, profile generation module 210 may deliver or communicate notifications related to point of interest or suppress all notifications to minimize distractions.

Figure 3:
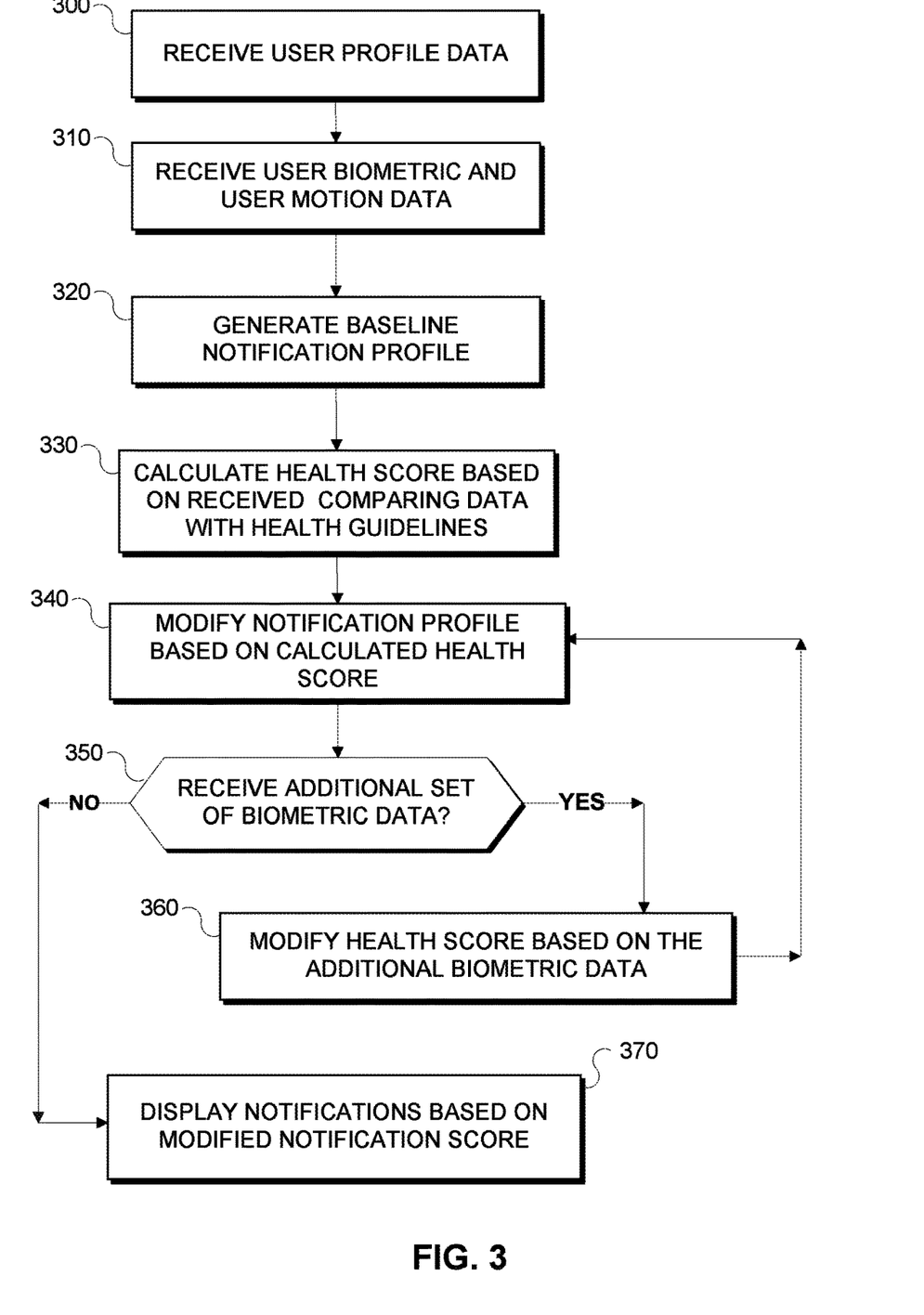
FIG. 3 is a flowchart depicting operational steps of an application, on a server computer within the data processing environment of FIG. 1, in accordance with an embodiment of the present invention.

FIG. 3 is a flowchart depicting operational steps of stress mitigation application 111, on server 110 within data processing environment 100 of FIG. 1, in accordance with an embodiment of the present invention. In various embodiments, stress mitigation application 111 receives user login credentials (block 300) and generates a user profile based on the received credentials. A user may set up a user profile and make selections from a graphical user interface (GUI), for example, via a web browser. In various embodiments, the user profile links with social media accounts associated with the received login credentials such that stress mitigation application 111 is capable of utilizing datamining and analysis of social media data or social media metadata using any tools know in the art, for example, Natural Language Processing. In various embodiments, stress mitigation application 111 may generate a behavior history based on the received social media metadata.

In various embodiments the digital reality device, for example, user device 120, is a wearable device that a user will have on continuously and stress mitigation application 111 receives, records, and stores in a data store, the user biometric data that determines the user motion or behavior (block 310). In various embodiments, stress mitigation application 111 receives generated notification data from user device 120 via network 130 and generates a baseline notification profile based on the datamined social media metadata, received notifications data, biometric data, and movement data associated with the user (block 320).

In various embodiments, stress mitigation application 111 calculates a health score (block 330) by comparing the received biometric data and movement data with health guideline data. The health guideline data is received from ingested healthcare publications described above. Stress mitigation application 111 modifies the notification profile associated with the user based on the calculated health score (block 340). In various embodiments, the modification occurs when the biometric data and movement data is outside a threshold of biometric and movement values determined to be safe by the healthcare publications. In various embodiments, the threshold may be predetermined by the user or healthcare professional. In response to the health score indicating the user is experiencing stress, stress mitigation application 111 may bundle, delay, or otherwise modify the delivery or communication of notifications to the user, as described above. If stress mitigation application 111 does not receive additional biometric or movement data (block 350 "NO" branch), stress mitigation application 111 displays or communicates the generated notifications, via user device 120, based on the notification profile associated with the user (block 370).

If stress mitigation application 111 receives additional biometric or movement data (block 350 "YES" branch), via user device 120, stress mitigation application 111 modifies the health score based on the additional received data (block 360). Stress mitigation application 111 may periodically query user device 120 for additional biometric data, movement data, location data associated with global positioning system data, and periodically modify the health score. The modified health score modifies the notification profile and may increase or decrease the amount stress mitigation application 111 modifies the delivery or communication of notifications to the user via user device 120. For example, if stress mitigation application 111 receives heart rate data from a heart rate sensor on user device 120, indicating an increasing heart rate associated with the user, stress mitigation application 111 will, for example, increase the time interval of the delay of displaying or communicating notifications to the user. In various embodiments, stress mitigation application 111 may continue to delay notifications for the duration that the heart rate associated with the user is elevated beyond a safe threshold, the safe threshold being determined by analyzed ingested healthcare publications or predetermined by a healthcare professional.

In an exemplary embodiment, Alice has a wearable computing device, for example user device 120, that Alice wears continuously. The wearable device communicates with stress mitigation application 111 via network 130. Stress mitigation application 111 receives biometric data and movement data that corresponds with a user sitting at a desk. Stress mitigation application 111 detects user device 120 generating notifications associated with incoming emails and calendar reminders. With the baseline notification profile, the generated notifications will trigger haptic and auditory feedback via user device 120. Stress mitigation application 111 detects movement data, or rotation and acceleration data, corresponding to shoulder and wrist rotation. Stress mitigation application 111 additionally detects biometric data, corresponding to a heart rate increase and perspiration, via user device 120. Stress mitigation application 111 compares the movement data and biometric data to healthcare publications and calculates a health score based on the comparison.

For example, the shoulder rotation is outside angles associated with healthy movement, increasing the health score by 5, the wrist rotation is within safe angles of movement, increasing the health score by 0, and the heart rate and perspiration indicate unhealthy stress levels increasing the health score by 8. Stress mitigation application 111 compares the calculated health score to a threshold of 10, that was predetermined by a health care professional, indicating that Alice is in a stressful situation that can lead to injury.

Stress mitigation application 111 then delays notifications generated by user device 120. Stress mitigation application 111 periodically queries the sensors on user device 120, for example every minute, monitoring the Alice's movement and biometrics. Based on the calculated health score stress mitigation application 111 a 30 minutes delay to notifications. Stress mitigation application 111 communicates bundled notifications via a display and haptic feedback, via user device 120, every 30 minutes while monitoring Alice's movement and biometric and may lower the delay interval if Alice's stress levels (i.e. calculated health score) decrease below a threshold.

Figure 4:
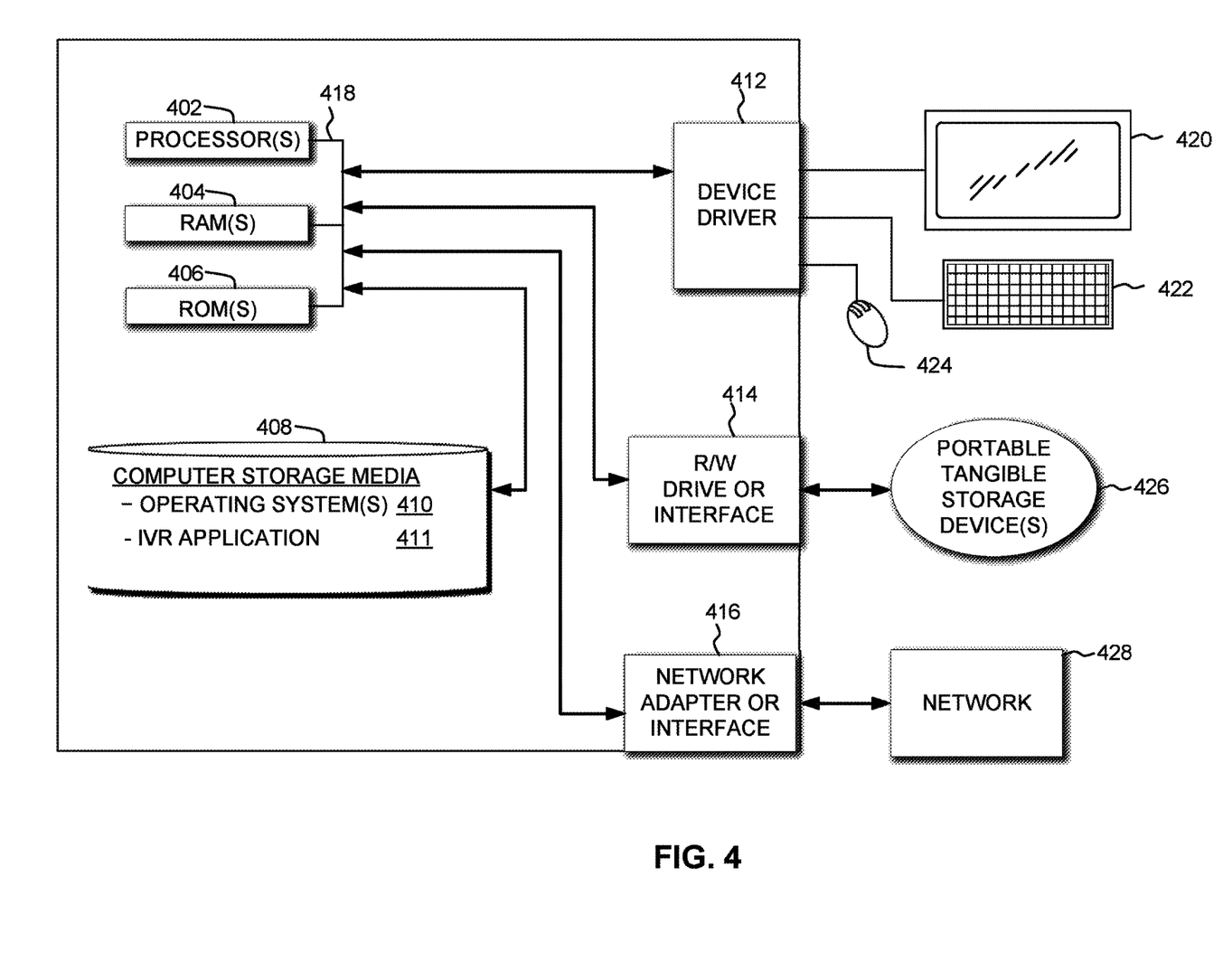
FIG. 4 depicts a block diagram of components of the server computer executing the application, in accordance with an embodiment of the present invention.

FIG. 4 depicts a block diagram of components of server 110 and user device 120 of distributed data processing environment 100 of FIG. 1, in accordance with an embodiment of the present invention. It should be appreciated that FIG. 4 provides only an illustration of one implementation and does not imply any limitations regarding the environments in which different embodiments may be implemented. Many modifications to the depicted environment may be made.

Server 110 and user device 120 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, stress mitigation application 111, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 and user device 120 may also include a R/W drive or interface 414 to read from and write to one or more portable computer readable storage media 426. Application programs 411 on Server 110 and user device 120 may be stored on one or more of the portable computer readable storage media 426, read via the respective R/W drive or interface 414 and loaded into the respective computer readable storage media 408.

Server 110 and user device 120 may also include a network adapter or interface 416, such as a TCP/IP adapter card or wireless communication adapter (such as a 4G wireless communication adapter using OFDMA technology) for connection to a network 428. Application programs 411 on server 110 and user device 120 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 110 and user device 120 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for reducing notifications on a user device, the method comprising:
   receiving one or more notifications associated with the user device;
   generating a notification profile associated with the user based on the received one or more notifications;
   querying position data associated with the user;
   querying vital sign data associated with the user;
   querying social media data associated with the user;
   analyzing the received position data, social media data and vital sign data associated with the user, wherein the social media data is analyzed by a natural language processing;
   calculating a health score associated with the user based on analyzed position data, social media data and vital sign data associated with the user;
   in response to determining the health score deviates from a threshold range, modifying the notification profile associated with the user, wherein modifying the notification profile is by altering the one or more notifications by:
      delaying the received one or more notifications by a predetermined time period;
      recalculating the health score periodically during the predetermined time period, wherein in response to the recalculated health score decreasing below the threshold range, reducing the predetermined delay time period; and
   communicating the one or more notifications, to the user, based on the modified notification profile, upon expiration of the time period.

2. The method of claim 1, wherein analyzing the received position data further comprises: comparing the received position data associated with the user to a predetermined set of health guideline data associated with digested health related publications.

3. The method of claim 1, further comprising:
   monitoring the received position data;
   updating the determined health score; and
   modifying the generated notification profile based on the updated determined health score.

4. The method of claim 1, wherein vital sign data associated with the user further comprises:
   heart rate data; and
   perspiration rate data.

5. The method of claim 1 wherein position data associated with the user further comprises:
   gyroscopic data received, via the user device;
   global position system data associated with the user's location, via the user device; and
   movement data via position sensors, via the user device.

6. A computer program product for reducing notifications on a user device, the computer program product comprising:
   one or more non-transitory computer-readable storage media and program instructions stored on the one or more non-transitory computer-readable storage media, the program instructions comprising:
   instructions to receive one or more notifications associated with the user device;
   instructions to generate a notification profile associated with the user based on the received one or more notifications;
   instructions to query position data associated with the user;
   instructions to query vital sign data associated with the user;
   instructions to query social media data associated with the user;
   instructions to analyze the received position data, social media data and vital sign data associated with the user, wherein the social media data is analyzed by a natural language processing;
   instructions to calculate a health score associated with the user based on analyzed position data, social media data and vital sign data associated with the user;
   in response to instructions to determine the health score deviates from a threshold range, instructions to modify the notification profile associated with the user, wherein instructions to modify the notification profile is by altering the one or more notifications by:
      instructions to delay the received one or more notifications by a predetermined time period;
      instructions to recalculate the health score periodically during the predetermined time period, wherein in response to the recalculated health score decreasing below the threshold range, instructions to reduce the predetermined delay time period; and
instructions to communicate the one or more notifications, to the user, based on the modified notification profile, upon expiration of the time period.

7. The computer program product of claim 6, wherein instructions to analyze the received position data further comprises: instructions to compare the received position data associated with the user to a predetermined set of health guideline data associated with digested health related publications.

8. The computer program product of claim 6, further comprising:
instructions to monitor the received position data;
instructions to update the determined health score; and
instructions to modify the generated notification profile based on the updated determined health score.

9. The computer program product of claim 6, wherein vital sign data associated with the user further comprises:
heart rate data; and
perspiration rate data.

10. The computer program product of claim 6 wherein position data associated with the user further comprises:
gyroscopic data received, via the user device;
global position system data associated with the user's location, via the user device; and
movement data via position sensors, via the user device.

11. A computer system for reducing notifications on a user device, the computer system comprising:
one or more computer processors;
one or more computer-readable storage media;
program instructions stored on the computer-readable storage media for execution by at least one of the one or more processors, the program instructions comprising:
instructions to receive one or more notifications associated with the user device;
instructions to generate a notification profile associated with the user based on the received one or more notifications;
instructions to query position data associated with the user;
instructions to query vital sign data associated with the user;
instructions to query social media data associated with the user;
instructions to analyze the received position data, social media data and vital sign data associated with the user, wherein the social media data is analyzed by a natural language processing;
instructions to calculate a health score associated with the user based on analyzed position data, social media data and vital sign data associated with the user;
in response to instructions to determine the health score deviates from a threshold range, instructions to modify the notification profile associated with the user, wherein instructions to modify the notification profile is by altering the one or more notifications by:
instructions to delay the received one or more notifications by a predetermined time period;
instructions to recalculate the health score periodically during the predetermined time period, wherein in response to the recalculated health score decreasing below the threshold range, instructions to reduce the predetermined delay time period; and
instructions to communicate the one or more notifications, to the user, based on the modified notification profile, upon expiration of the time period.

12. The computer system of claim 11, wherein instructions to analyze the received position data further comprises: instructions to compare the received position data associated with the user to a predetermined set of health guideline data associated with digested health related publications.

13. The computer system of claim 11, further comprising:
instructions to monitor the received position data;
instructions to update the determined health score; and
instructions to modify the generated notification profile based on the updated determined health score.

14. The computer system of claim 11, wherein vital sign data associated with the user further comprises:
heart rate data; and
perspiration rate data.

15. The computer system of claim 11, wherein position data associated with the user further comprises:
gyroscopic data received, via the user device;
global position system data associated with the user's location, via the user device; and
movement data via position sensors, via the user device.

* * * * *